United States Patent [19]

Warsager

[11] 3,961,121

[45] June 1, 1976

[54] TRANSFER TAPE FOR SURFACE DECORATING AN ARTICLE

[76] Inventor: Rubin Warsager, 72 Luddington Road, W. Orange, Newark, N.J. 07052

[22] Filed: Dec. 14, 1973

[21] Appl. No.: 424,869

[52] U.S. Cl. .................................. 428/200; 197/172; 428/207; 428/343; 428/354; 428/914

[51] Int. Cl.$^2$ .......................... B32B 3/18; B32B 7/06; C09J 7/02

[58] Field of Search ......................... 117/3.2, 3.3, 3.4; 197/156, 172; 428/204, 205, 207, 343, 352, 354, 914, 200

[56] References Cited

UNITED STATES PATENTS

| | | | |
|---|---|---|---|
| 349,026 | 9/1886 | Anderson | 197/172 |
| 385,391 | 7/1888 | Underwood et al. | 197/172 |
| 2,029,377 | 2/1936 | Kaplan | 117/3.2 X |
| 2,700,629 | 1/1955 | Townsend | 101/211 X |
| 3,309,256 | 3/1967 | Warsager | 156/230 X |
| 3,359,127 | 12/1967 | Meyer et al. | 117/3.4 |
| 3,463,651 | 8/1969 | Warsager | 117/3.3 |
| 3,648,604 | 3/1972 | Warsager | 101/181 |
| 3,708,320 | 1/1973 | Hurst et al. | 117/3.3 |

*Primary Examiner*—William A. Powell
*Assistant Examiner*—Thomas Bokan
*Attorney, Agent, or Firm*—Lerner, David, Littenberg & Samuel

[57] ABSTRACT

The transfer tape of the present invention comprises a continuous web or base material having a heat release material thereon, followed by a layer of pigment or metallics, and finally a layer of sizing or adhesive material. The layer of pigments and/or metallics is provided so as to divide the continuous tape into repeating, sequentially arranged color zones, dividing the tape transversely. Each such zone may itself, in a preferred embodiment, include color regions of various shapes therewithin, and the color zones on the tape may also be divided longitudinally into adjacent color zones upon the tape.

8 Claims, 4 Drawing Figures

TRANSFER TAPE FOR SURFACE DECORATING AN ARTICLE

FIELD OF THE INVENTION

This invention relates to a method for producing and applying a multi-colored surface decoration to an article and, more particularly, to a process for applying a multi-colored decoration to objects which are in commercial use by means of a single web of transfer tape, in a hot stamping procedure. More particularly, this invention relates to continuous transfer tapes having at least two repeating, sequentially arranged color zones thereon, and their use in a hot stamping process in order to provide articles containing multi-colored decorations.

BACKGROUND OF THE INVENTION

In many commercial fields it is necessary to decorate containers, such as for example, plastic perfume bottles, lipstick cases, and the like, in order to enhance their sales appeal and to impart to the customers a sense of the quality of the product. It is also necessary to decorate these items quickly, in order to maintain low costs, and the decorative material must have a good degree of permanence in order to promote resale of the item and to assure the customer that he is purchasing a quality product. It is also essential that the decorative material have no blemishes therein, lest the customer have an adverse reaction as to the quality of the product in the decorated container.

The processes previously used to decorate such objects have generally taken the form of printing or stamping techniques. One of the more successful of these techniques is that of hot stamping. In this process a tape is used to carry the material, generally either a pigment or metallics, to be transferred to an article. The tape is generally Mylar, and includes a release coating, the vacuum metallized or pigmented coating, and an adhesive coating thereon. When heat and pressure are applied to the tape the release material liquifies and permits the metallized or pigmented coating to be transferred to the article, and the adhesive insures that this coating is positively secured to the article.

In the prior art, when it was desired to apply a multitude of colors or decorations consisting of a plurality of colors to a cylindrical article, such as for example, the surface of a round plastic bottle, it was necessary to apply each color separately and in a separate machine. For example, if it was desired to apply a decoration containing the colors blue, green and gold, it was necessary to first apply the blue color in one machine from a transfer tape as described above, and then the gold in a second machine from another tape, and finally the green color in yet a third machine from still another tape, all in separate operations. These operations were generally accomplished in hot stamping processes in which pressure and heat were applied to the transfer tape causing the material on the tape or leaf to adhere to the surface to be decorated. In each of the machines the tape contained a solid color and the design produced on the article depended upon the configuration of the die. Therefore, when two or more colors in registration were to be applied by such stamping processes, the part to be decorated had to be accurately inserted in the subsequent hot stamping presses for each different color so that the next color thereon was in accurate registration with the previous colors placed on the surface.

It has also been proposed to utilize a single machine when two or more colors in registration are to be applied in the roll stamping process. However, in that case, not only must the article be accurately located in the press prior to the second stamping process, but the roll leaf or tape must be removed from the machine and replaced by a tape bearing the next color, and the die must be replaced and realigned with the article in order to insure that an accurate hit with the proper die is made in the next pass, during the application of the next color. While this system may appear to be more economical than utilizing separate machines, the problems and costs involved are still substantial. Therefore, while such hot stamping processes can be extremely economical in one-color decorations, the machine and labor time costs have become exceedingly high with multi-color work.

There are several other techniques which have been employed in an attempt to provide such multi-colored decorations. Thus, for example, a hot stamping machine including a number of die stations disposed about the periphery of an indexing rotary table has been used. The articles to be decorated are placed upon rotary mandrels upon the rotating table, so that the articles pass across the surfaces of stationary concave dies at each die station, with a single color tape disposed therebetween at each such station. These techniques have not proven to be totally satisfactory, however, since they do not employ a single transfer tape, involve problems of foil or tape wrinkling, and are quite costly and of limited versatility.

There have thus been attempts to provide techniques by which multi-colored decorations may be applied to articles from a single continuous transfer tape. Thus, in my U.S. Pat. Nos. 3,648,604, issued Mar. 14, 1972, and 3,463,651, issued Aug. 26, 1969, I disclose methods for applying multi-color designs to a web, preferably of Mylar. By employing these techniques by which colors are applied from various foils to a single continuous web as in U.S. Pat. No. 3,648,604, or by conventional printing processes, as in U.S. Pat. No. 3,463,651, it is possible to apply a multi-color design to an article from a single continuous transfer tape. The need to employ such complex procedures in order to prepare the transfer tape becomes quite expensive, however, and has thus led to a search for a simpler, less expensive procedure to produce such multi-colored decorations. That is, in order to prepare such transfer tapes it has been necessary to prepare engraved cylinders for each color to be applied to the tape, and such a procedure is so costly and time consuming that it has only been economically justified where extremely large quantities of the tape are to be employed. The search for a more easily and cheaply prepared transfer tape for producing multi-colored decorations has thus continued, especially for the preparation of smaller quantity lots.

Accordingly, it is an object of the present invention to provide a transfer tape to decorate the surface of an article with a registered multi-color design in a continuous process utilizing a single apparatus.

A further object of the present invention is to provide a single inexpensive transfer tape having a predetermined sequence of colors thereon to apply a multi-colored surface decoration to an article. Yet another object of the present invention is to provide a transfer tape to apply a multi-colored surface decoration to an article by a process which is relatively inexpensive and substantially faster than those previously proposed.

It is still another object of the present invention to provide a transfer tape to apply a multi-colored surface decoration to an article by a process in which a single machine is utilized and which requires no transfer of the article to be decorated or changing of transfer tapes or dies.

SUMMARY OF THE INVENTION

In accordance with the present invention a multi-colored decoration is applied to the surface of an article with the aid of a continuous transfer tape having at least two repeating sequentially arranged color zones thereon. The surface of the article to be decorated is brought into engagement with a heated die at a hot stamping station with a portion of a first color zone on the tape interposed therebetween, and a first portion of the die and the tape are brought together against the surface of the article to be decorated to apply a decoration to that surface from that first color zone. The tape is then advanced through the hot stamping station and the surface to be decorated engages a second portion of the die with a portion of a second color zone on the tape interposed therebetween, and the second portion of the die presses against the tape to apply a decoration to the surface of the article from that next color zone so that a multi-colored surface decoration is applied to the article. The second or subsequent application of the second or subsequent portions of the die engages the surface to be decorated at a predetermined location in registration with the decoration applied to the surface by the first application of the die, so that the multi-colored design is itself in registration. The number of die portions may thus correspond to the number of color zones on the tape, or various combinations of die portions and color zones may be employed, so long as a portion of the die engages a portion of one of the color zones in the tape upon each die application. The various combinations of multi-colored decoration which may thus be applied are obviously considerable.

In accordance with one embodiment of the present invention, a substantially cylindrical article is decorated by the above-described process by placing the article on a mounting mandrel in the stamping zone and rotating the article about its longitudinal axis in synchronism with the movement of the transfer tape and the die. The color zones on the tape are arranged such that when the article has rotated 360°, or any preselected portion thereof, the next color zone is presented adjacent the article. Another portion of the die is then engaged against the tape, and moves tangentially to the article in engagement with a portion of the second color zone on the tape as the article is rotated about its longitudinal axis in synchronism with movement of the transfer tape between the surface of the article and the die, so that the second color is applied to the surface of the article in registration with the first color applied. A plurality of colors and dies may be used in a continuation of the process so that numerous colors may be applied in registration on the article.

In another embodiment of this invention, a generally non-round article, such as an elliptical or flat article, is decorated in the above-described process by a technique generally known as "vertical" stamping. Thereby, the article is held stationary on a platform, upon which it may be raised and lowered with respect to a stationary portion of a heated die. A first color zone of the continuous transfer tape of this invention is interposed therebetween, and as the article is raised into engagement with the first portion of the die, a decoration is applied to the surface of the article from the first color zone. The article is then lowered, or disengaged from the first die portion, and this procedure is repeated with a second, or subsequent stationary die portions, and with a second, or subsequent, color zones on the tape interposed between the article and die portion, so as to apply multi-colored decorations, in registration, on the article.

In another aspect of this invention, a continuous transfer tape for applying multi-colored decorations to articles is supplied. The tape includes at least two repeating sequentially arranged color zones thereon, and in a preferred embodiment includes a registration mark thereon, for location of a portion of one of said color zones by aligning means such as an electric eye. Location of a portion of one of said sequentially arranged color zones may, however, be effected without such a registration mark, by employing a color sensitive electric eye which is actuated by the particular color located on one of said color zones.

In another preferred embodiment of this invention, said color zones may include additional color regions therewithin. In this manner each individual die portion may impart different colors to the article being decorated during the stamping operation within any given color zone. These additional color regions located within a color zone may be of any shape, including rectangular, square, circular, or of a purely fanciful design.

BRIEF DESCRIPTION OF THE DRAWINGS

The above, and other objects, features and advantages of this invention, will be apparent in the following detailed description of an illustrative embodiment thereof which is to be read in connection with the accompanying drawings, wherein.

DETAILED DESCRIPTION

Figure 1:
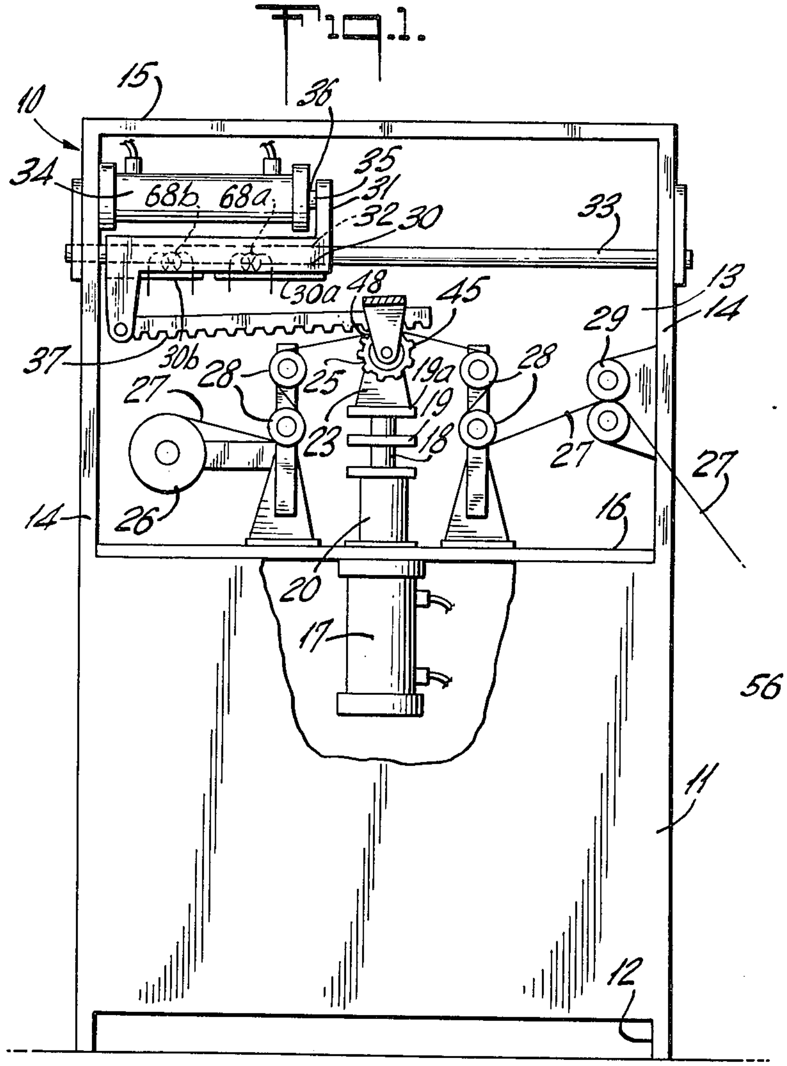
FIG. 1 is a plan view of a typical hot stamping apparatus for use in the method of the present invention.

Referring now to the drawings, and initially to FIG. 1 thereof, it will be seen that the hot stamping machine 10, adapted to perform the method of the present invention, as shown therein, has a housing 11, supported on legs 12 which may be firmly anchored to the floor to preclude lateral movement of the machine.

The work area or printing staton 13 is an open area extending from front to rear of the machine and is defined by the side rails 14, top rail 15 and a rigid horizontal bed 16. Securely fastened to the bed 16 is an air cylinder 17 which is supplied by an outside source (not shown) with air under pressure. The air cylinder 17 has a diaphragm therein (not shown) and the air can be fed into the cylinder either above or below the diaphragm. A shaft 18 extends out of the cylinder 17 and is rigidly fixed to the diaphragm. Thus, as the diaphragm moves in an upward or downward direction, the shaft 18 moves correspondingly therewith.

The end of shaft 18 is fixed to a platform 19 which is constrained to move in a vertical direction only, corresponding to movement of shaft 18. A pair of elevator guides 20 on either side of the shaft 18 and having longitudinal bores therein for the reception of guide shafts (not shown) secured to platform 19 are provided to supply rigidity and stability to the platform. By utilizing these elevator guides, platform 19 is firmly constrained to vertical movement without any lateral rocking thereof. The platform may also include an upper part 19a rigidly held to platform 19 by posts or it may be integral with the platform.

Mounted on top of and securely fastened to upper part 19a of the platform 19 is a housing 23 in which a gear train is located. A mandrel (not shown) is rotatably secured to housing 23 and either can be free to rotate or can be positively driven through the gear arrangement within housing 23. The article or object 25 to be decorated is placed on the mandrel such that it can be either rotated or held stationary thereon.

A reel 26 is rotatably mounted on housing 10 and a tape 27 is wound thereon. The tape is preferably composed of Mylar having pigments and/or metallics thereon, which is to be transferred in the form of a multi-colored decorative design to the object 25. Tape 27 is illustrated in greater detail in FIGS. 2 and 4, wherein it is seen that the tape is provided with at least two repeating, sequentially arranged color zones, 27*a* and 27*b* in FIG. 2 and 27*c–e* in FIG. 4, dividing the tape transversely. The tape itself may also include a vacuum metallized portion thereon. Thus the tape may include at least two repeating sequentially arranged color zones, designated 27*a* and 27*b* in FIG. 2, or it may include at least two such series of repeating sequentially arranged color zones, dividing the tape longitudinally, so that at least two color or color patterns may be imparted to various portions of the article during each application of the die thereto. As can also be seen in FIG. 4, each such color zone may also include additional color regions, 62–65, thereon. These color regions within each color zone may be of any shape, including conventional shapes, such as square, rectangular, circular, or may be of a purely fanciful design. The presence of these additional color regions may thus result in the establishment of further multi-colored decorations on the article with the engagement of a die means against any given color zone. The character of the die portion which engages each such color region will thus determine the design or pattern each such color establishes on the article.

Figure 4:
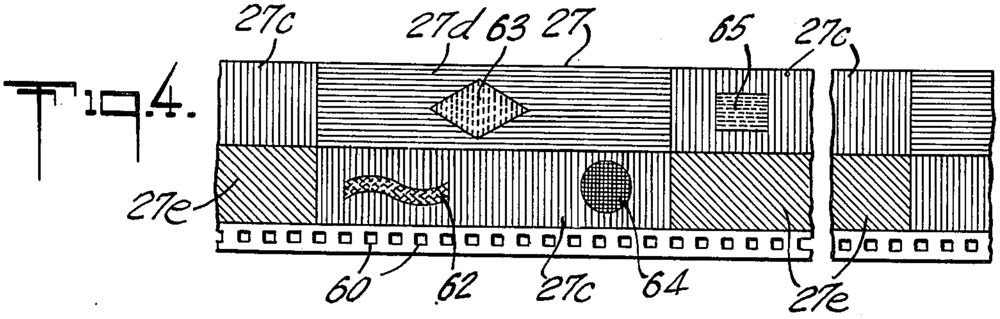
FIG. 4 is a plan view of a section of a preferred transfer tape of the present invention, including additional color regions within the color zones thereon.

The tape may also include a registration mark 61 which will locate a portion of a particular repeating color zone. This registration mark 61 may thus serve to actuate an electric eye, or other such apparatus for signaling the location of that particular color zone, so that the portion thereof where the die will be applied may be properly established. It is also possible, though less preferable however, that the registration mark will merely serve to visually signal the operator with respect to the location of a portion of a particular color zone. Further, as shown in FIG. 4, the tape 27 may include locater means, such as sprocket holes 60 which will provide for the alignment of each such color zone with another color zone or zones, and for the engagement of the die to a particular portion of each such color zone such that they are transferred to a predetermined position with respect to each other color zone transferred to the article.

These zones may be applied to the tape by various printing methods, flexography, rotogravure, silk screen, etc., and may take any desired color or colors selected in accordance with the colors to be applied to the article. For illustrative purposes, the tape in FIG. 2 has been lined in the drawings to illustrate the colors blue and red, and the tape in FIG. 4 has been lined in the drawings to illustrate the colors red, blue and green. Each of the zones divide the tape transversely, and has a length which is equal to or greater than that portion of the circumferential dimension of the typical article which is to be printed. Furthermore, the width of the color zones shown in the tape of FIG. 4 may divide the tape in half, or be placed to produce any desirable division thereof. Further, the tape of FIG. 4 includes various color regions, as described above, which are lined in the drawings to illustrate the colors.

Typically, the tape is formed from a web or base material which is made of a plastic such as Mylar or cellophane and has a heat release material on one side thereof. The heat release material is heat sensitive, and a layer of pigment and/or metallics is applied to the release material by a process such as roller-coating, printing, vacuum metallizing, etc., following which a layer of sizing or adhesive is applied to the tape, to insure adhesion of the pigment and/or metallic layer to the article to be decorated. When the surface of the tape is brought into contact with the surface of the article to be decorated, as more fully described hereinafter, and heat and pressure are applied to the opposite surface of the web, the heat sensitive or release material softens and permits the pigments and/or metallized portion to be transferred directly to the surface to be decorated.

Referring again to the apparatus of FIG. 1, the tape 27 is passed over a plurality of tape guides 28 of which four are shown. However, the number used is a matter of choice. The guides 28 are preferably rollers having a low coefficient of friction and have flanged ends to prevent the tape from moving laterally of the rollers. The tape 27 is threaded around the left set of guides 28, as illustrated in FIG. 1 and thence between the object 25 and a die 30, with its colored surface facing object 25, and it is subsequently passed over the right set of guides 28. The tape is then fed between a pair of pull rollers 29 having surfaces of a relatively high coefficient of friction or any other type of surface which will grip the tape. For example, a knurled surface can be applied to the rollers.

Rollers 29 are rotatably mounted in housing 10 and can be driven by a motor or other means (not shown) or can be actuated by hand to advance the tape 27 after the foil carried by the tape has been transferred to the object 25. Thus by rotating one or both of the rollers 29, a positive grip is exerted on tape 27 and it is pulled to the right as shown in FIG. 1 so that a fresh portion of the tape having foil thereon is placed between the object 25 and the dies 30 for each new object placed on the mandrel.

In the illustrative embodiment of the present invention the die 30 consists of two die portions 30*a* and 30*b*, each of which constitute a separate die section for printing a different decorative design on the article. Each of the dies, which can be made of metal, silicone, rubber, plastic, or other suitable material, can have a fanciful design etched thereon or can be otherwise etched with stripes or the like according to the desires of the user and depending upon how he wishes to decorate the object 25. The dies are fixed in adjacent relation on a carriage 31 having openings 32 bored therein for the reception of a pair of guide rails 33. The carriage 31 is freely slidable on guide rails 33 under the influence of an air cylinder 34 or any other motor means. An arm 35, is fixed at one end thereof to the carriage 31 and at its opposite end to the actuator rod 36 of a piston in air cylinder 34. Under the influence of air pressure, the rod 36 is selectively moved to the right and into contact with tape 27 and object 25. The die sections 30 *a* and 30*b* are preferably heated by electrical means (not shown) and by applying heat and pressure to the tape and the object, the foil on the tape can be transferred to the object.

The apparatus described above may also include a rack 37 and pinion 45 arrangement similar to that described in my U.S. Pat. No. 3,657,054, which is incorporated herein by reference, and by which the article on the mandrel is rotated, so as to insure that the surface velocity of the article 25 is the same velocity as that of the moving die 30 and tape 27.

Initially the transfer tape 27 is inserted in the apparatus with a portion, such as the leading edge 50 of a selected color zone, for example zone 27*a* on the tape, in tangential engagement with an article placed on the mandrel on platform 19*a*. The alignment of the leading edge portion of the tape 27 with a predetermined position of the article 25 is facilitated by locater means, such as sprocket holes 60, upon the tape 27. The locater means may also include a mechanical or printed registration mark upon the tape 27, means to trigger an electric eye upon proper location of the tape 27, or other such means.

The sequence of operation of the components of the apparatus is such that when the machine is started the air cylinder 17 raises object 25 from its lower position to a point where it is in position to bear against the die 30 as the latter is moved thereover. After article 25 reaches its raised position ram 34 moves die 30 to the right so that the leading edge portion of die section 30*a* contacts tape 27 and object 25. Simultaneously, rollers 29 commence drawing tape 27 through the machine. As die 30*a* traverses the surface of object 25, it bears on a portion of color zone 27*a* of the tape 27, and the pressure and heat applied to the die enables a transfer of pigments and/or metallics on that portion of tape 27 to be impressed onto the surface of object 25. Since die 30, object 25 and tape 27 are all moving at the same velocity, a perfect registration of these elements will occur without tearing, stretching, or wrinkling of the foil, which is a thin material. Therefore, in a highly preferred embodiment of this invention, the apparatus will include a positive drive mechanism for rotating both ends of the article at the same surface speed which the die 30 moves thereacross. In this manner twisting of the article is prevented. This twisting would occur upon rotation of the article from one end only, since the positively driven end of the article is initially turned, while the free-wheeling end will remain momentarily static, thus developing a torque in the article. This drive mechanism may thus include a pair of gripping members engaging both ends of the article in a manner such that when a turning force is applied to one such member, it is simultaneously applied to the other, such as by a gear or pulley arrangement. These gears or pulleys may thus also be directly connected to the rack 37 and pinion 45 arrangement described above, so that the moving die now travels at the same velocity as both ends of the rotating article.

Die section 30*a* is dimensioned such that as the end of that die section approaches article 25, the article has been rotated 360°, or any portion thereof corresponding to that portion of the article which is to be decorated. In this embodiment of the present invention, die 30 continues to move to the right so that die section 30*b* becomes engaged with the tape and the article therebeneath to print another decoration on the article 25. In this case the width of the sequential color bands on tape 27 are substantially equal to the circumferential dimension of article 25 so that after the article has completed one revolution with section 27*a* passing thereover, the initial portion 52 of section 27*b* is presented adjacent the article at substantially the same location at which the initial section 50 of the first printed color zone 27*a* engaged the article. Thus when die section 30b engages tape 27 it is engaged with a portion of a second color zone on the tape therebetween, to transfer the next color to the article. Further, because of its predetermined position with respect to die portion 30*a*, the leading edge of die portion 30*b* engages article 25 at the same location as the leading edge of die 30*a*. As a result, the decoration applied by the die section 30*b* will register in accordance with the predetermined pattern with the decoration applied by die section 30*a*. In this manner, a multi-colored decoration is applied to the surface of the bottle in a continuous process.

While only two colors are applied to the article in this illustrative embodiment of the present invention, it is contemplated that the tape 27 may include more than two sequentially arranged repeating color zones and in particular three, four or more color zones may be used, each of which again may also include various additional color regions thereon. In such a case, die 30 would be provided with three or four corresponding die sections, determined by the number of colors on the tape arranged in substantially the same manner as described above, so that the decorations applied by each of the die sections will be in registration with the decorations already stamped on the article by the preceeding die sections or, in a much less preferred procedure, the die may be returned to its initial position, to the left as seen in FIG. 1, after completion of a given number of such die applicatons, i.e. as die section 30*b* or any succeeding die portion completes the application of a color zone of tape 27 upon the article. The tape 27 may then be re-started and the die 30 will then again initiate its movement to the right, actuated by ram 34, so that it again engages a portion of a subsequent color zone on tape 27, thus imparting yet another color to the article 25. It is, however, highly preferred that the number of die portions be such that only one movement of the die 30 across the article 25 will be required to complete the decoration of the article.

In a preferred embodiment of the apparatus of the present invention, referring again to FIG. 1, each die portion, 30*a* and 30*b*, of die 30 will include separate heating elements 68*a* and 68*b* therein, such as heating coils, etc. As noted above, the apparatus of the present invention comprises a hot stamping machine, whereby the die 30 is heated, and thereby causes a softening of the release material upon the transfer tape. This, in turn, permits the transfer of the pigments and/or metallics from the transfer tape to the article upon each application of the die 30. It has also been discovered, however, that when utilizing the transfer tape 27 of the present invention, including repeating sequentially arranged color zones thereon, that a particular improvement of the apparatus of this invention provides significantly improved results. Thus, it has been discovered that the various color zones upon the transfer tape 27 of this invention are each applied with the best results to the article 25 when that portion of the transfer tape 27 is heated to a particular temperature. That is, while a particular color zone may be applied to the article 25 with a minimum of wrinkling or distortion when the tape is heated to one particular temperature, the next or any other such color zone will be so applied when the tape is heated to another particular temperature. Therefore, in order to accomplish such an optimum transfer of each such color zone to the article 25, each die portion **30*a* and 30*b* is heated to the specific predetermined temperature so required for the particular color zone upon the transfer tape 25 to which that particular die portion is to be applied. The specific temperature to which each such heating element 68*a* and 68*b*** is raised is established by heating means, not shown, such as electrical heating means, etc.

Figure 3:
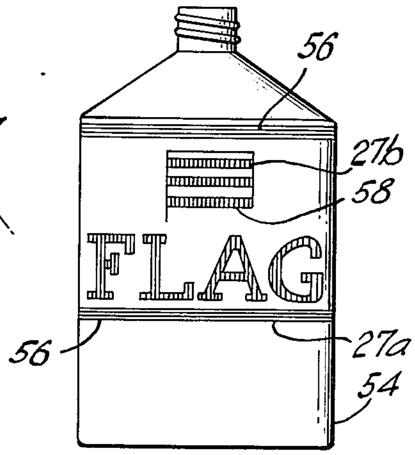
FIG. 3 is an elevational view of an article having a multi-colored surface decoration thereon, which decoration was applied by the method of the present invention.
Figure 2:
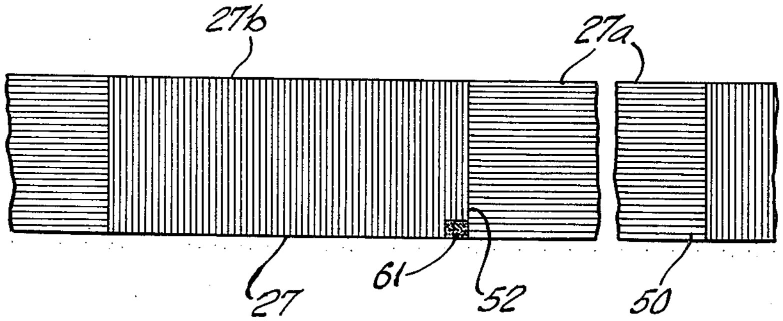
FIG. 2 is a plan view of a section of the transfer tape of the present invention.

An example of the type of stamping done by the method of the present invention, as described above, is illustrated in FIG. 3 wherein a bottle 54 has been printed in two colors from the zones **27*a* and 27*b* of a tape such as that illustrated in FIG. 2. In this case the initial die section 30*a* has the word "FLAG" etched thereon, in mirror image of course, along with a pair of stripes 56. As the first die section 30*a* engages the initial portion 50 of color zone 27*a* it moves thereover and prints the blue secton of the decorative design on the article. The next portion of the multi-colored design to be printed in the illustrative embodiment constitutes the flag 58 which is printed in the second color of the decoration, i.e. red from zone 27*b*. Since the location of die 30*b* and the decoration etched thereon is located in a predetermined relation with respect to section 30*a*, the decoration applied to the surface of the article 25 by die 30*b* will be in a predetermined location on the article with respect to the decoration applied by die 30*a*. Thus, when die section engages article 25, flag 58 will be imprinted on the article at the desired location in registration with the word FLAG in the manner illustrated in FIG. 3.**

At the completion of the printing operation with die section **30*b*, ram 17 retracts the platform 19*a* and the mandrel on which article 25 is mounted and ram 34 automatically returns to the initial position thereof illustrated in FIG. 1. This permits the printed article to be removed and a blank article to be inserted on the mandrel. After the blank article is inserted, the ram 17 is again actuated to nove the article into engagement with the tape 27 and adjacent the path of travel of die 30. When the article has achieved this operating position, ram 34 begins to operate and moves die section 30*a*** into engagement with the tape and the article for printing thereon.

In another embodiment, it is contemplated that the process of the present invention need not utilize a tape 27 having color zones equal in length to the circumferential dimension of the article being worked on. This would be particularly important where articles of various sizes are to be printed from one roll of tape, so that it would be inconvenient to change the tape for each class of article printed. In this embodiment, ram 34 and drive mechanism for rollers 29 controlled such that after the die section 30a has completed its engagement with article 25, so that the printing of the first color from the zone **27*a* is completed, the movement of ram 34 is stopped and the tape 27 is indexed by drive mechanism 29 and with the aid of locator means, registration mark 61, or sprocket holes 60 on tape 27, until a portion of the next color zone 27*b*, is engaged with the tape. It is clear that a number of electronic or pneumatic control systems for this purpose can be constructed in which the amount of advance can be selectively adjusted in accordance with the circumferential dimensions of the article being worked on, and the particular portion thereof which is to be decorated. During the advance of tape 27, article 25 is held stationary and its mandrel is not rotated by the rack and pinion arrangement illustrated in the drawing. When the tape has advanced the predetermined distance, ram 34 is reactivated and die section 30*b* engaged with the tape and the article 25** so that the design etched thereon would be printed on the article in registration with the previously printed decoration.

While the above-described embodiments of the invention have been discussed primarily in relation to stamping on a substantially cylindrical article which is adapted to be rotated, it is contemplated that the method of the present invention can be utilized with flat or other non-round objects. For such objects, the apparatus can be modified as described in my U.S. Pat. No. 3,634,174, which is incorporated herein by reference, or other hot stamping devices may be modified in accordance with this method.

Where flat or non-round objects are to be printed by the apparatus and method of the present invention, the article cannot be rotated and the rack and pinion arrangement illustrated in FIG. 1 is not necesssary. In that event, the first die section **30*a* is moved into position above the article to be printed and the tape 27 is interposed by the drive mechanism 26–29 between the die and the surface of the article to be printed with a portion of one of its color zones aligned with a predetermined portion of the article. Ram 17 is raised to engage the article with the tape against the surface of die section 30*a*, which, as in the above-described embodiment, is electrically heated, so that the design etched on the die section is imprinted on the article. After the required time in place against die 30*a* for printing on article 25 has passed, ram 17 is slightly retracted and tape 27 is advanced by rollers 29 until a portion of the next color zone 27*b* on the tape is again properly aligned between the die 30 and the article 25. Simultaneously, ram 34 is actuated so that the next die section 30*b* is positioned above the article. After the tape has completed its advance to a portion of the next color zone, and die section 30*b* is positioned above the article, ram 17 is reactuated to engage the proper portion of article 25 with the die section 30*b*.**

In a preferred method of decorating such objects, however, the die 30, including a number of die portions, may be maintained at a stationary location above the article 25, and the article itself may be moved into position below each succeeding die portion, preferably by means of a conveyor belt or other such apparatus. The transfer tape of this invention is positioned between the die portions and the articles, one of which may be maintained below each such die portion, with a portion of a separate color zone therebetween, such that the number of die portions corresponds to the number of color zones, and the number of articles maintained therebelow. The articles may be retained upon a modified platform 19*a*, such that a number of articles 25 may be mounted thereon, again corresponding to the number of die sections on the die 30. Thus, upon each upward stroke of the ram 17, each article will engage with a particular die portion, with the particular color zone corresponding thereto therebetween. After each such ram actuation, the ram 17 will be lowered from the die 30, and the articles 25 will be moved one station, so that upon each succeeding actuation of ram 17 the article will be engaged with the next succeeding die portion of the die 30, again with the particular color zone corresponding thereto therebetween. Furthermore, between each such actuation, the tape 27 will be moved forward a distance corresponding to the number of repeating sequentially arranged color zones on the tape. Thus, by way of example, with an article 25 which is to be decorated from three separate color zones, and thus wherein die 30 includes three separate die portions, three articles 25 will be mounted on ram 17 and platform 19*a*, each below one of the three die portions. The tape, having three repeating sequentially arranged color zones, will be positioned therebetween, such that a portion of each of the three color zones is between each die portion and article 25. Upon actuation of ram 17, the three articles 25 will each be decorated with one of the three die portions, each with its respective color zone therebetween. Subsequently, the articles 25 will be moved sequentially to the next succeeding station, so that upon each succeeding actuation of ram 17 it will be decorated by the next succeeding die portion of die 30, again with the next succeeding color zone therebetween, until each article 25 has been decorated at each of the three succeeding stations. Also, the tape must be moved a distance corresponding to the three color zones thereon upon each actuation of ram 17, so that the same repeating color zone is between each die portion of die 30 upon each ram movement.

It is thus seen that a convenient process is described for decorating articles with registered multi-colored decorations, utilizing a single apparatus and a single continuous transfer tape. This invention eliminates the multiple handling of the article to be decorated as required by the prior art and also eliminates the multiplicity of machines previously utilized, or the alternative need for the expensive multi-station devices of the prior art, employing multiple tapes, with their many attendant problems.

Although illustrative embodiments of the present invention have been described herein with reference to the accompanying drawings, it is to be understood that the invention is not limited to those precise embodiments and that various changes and modifications may be effected therein by one skilled in the art without departing from the scope or spirit of this invention.

What is claimed is:

1. A transfer tape for use in decorating the surface of articles with a design, comprising a base, a heat release material applied to said base, at least two sequentially arranged color zones transversely dividing said tape and applied to said heat release material so that said color zones do not include said design which is to be applied to said article, said color zones comprising pigment, each of said color zones including only a single pigment layer, whereby upon the application of a die to said color zones the characteristics of said die determine the characteristics of said design to be imparted to said articles, and an adhesive coating.

2. The transfer tape of claim 1 including sprocket holes disposed at equal distances along the longitudinal edge of said transfer tape.

3. The transfer tape of claim 1 wherein each of said sequentially arranged color zones comprises at least two adjacent color zones dividing said transfer tape longitudinally.

4. The transfer tape of claim 1 wherein each of said sequentially arranged color zones is of approximately equal length measured longitudinally with respect to said transfer tape.

5. The transfer tape of claim 1 wherein said sequentially arranged color zones include at least one additional color region thereon.

6. The transfer tape of claim 1 including a registration mark for decorating the leading edge portion of one of said sequentially arranged color zones.

7. The transfer tape of claim 1 wherein said tape comprises discrete sheets including said sequentially arranged color zones thereon.

8. The transfer tape of claim 1 including repeating sequentially arranged color zones thereon.

* * * * *